(12) United States Patent
Grosz

(10) Patent No.: US 6,381,942 B1
(45) Date of Patent: May 7, 2002

(54) THIN WALLED ATTACHED SILVER FILLED GOLD JEWELRY

(75) Inventor: Robert Grosz, Saugus, CA (US)

(73) Assignee: Jewelmatic, Inc., Long Beach, CA (US)

(*) Notice: Subject to any disclaimer, the term of this patent is extended or adjusted under 35 U.S.C. 154(b) by 0 days.

(21) Appl. No.: 09/521,015

(22) Filed: Mar. 7, 2000

Related U.S. Application Data

(63) Continuation-in-part of application No. 09/100,726, filed on Jun. 19, 1998, now Pat. No. 6,092,350.

(51) Int. Cl.[7] .............................. B21L 3/00; B21C 37/04
(52) U.S. Cl. .......................... 59/35.1; 59/16; 29/896.41
(58) Field of Search .......................... 59/35.1, 80, 82, 59/1, 16; 29/896.41

(56) References Cited

U.S. PATENT DOCUMENTS

| 550,705 A | * | 12/1895 | Williams |
| 831,887 A | * | 9/1906 | Nicholson |
| 944,640 A | * | 12/1909 | Ungerer |
| 978,846 A | * | 12/1910 | Carlisle |
| 1,196,010 A | * | 8/1916 | Merritt |
| 1,227,346 A | * | 5/1917 | Trood |
| 1,610,225 A | * | 12/1926 | Metcalf |
| 2,425,299 A | * | 8/1947 | Ballou |
| 3,778,238 A | * | 12/1973 | Tyler et al. |
| 4,986,067 A | * | 1/1991 | Caccialupi |
| 4,996,835 A | * | 3/1991 | Rosenwasser |
| 5,425,228 A | * | 6/1995 | Hillel |
| 5,626,012 A | * | 5/1997 | Fabbro |
| 5,653,100 A | * | 8/1997 | Dal Monte |
| 6,092,358 A | * | 7/2000 | Gosz |

FOREIGN PATENT DOCUMENTS

| GB | 2042943 | * 1/1980 |

OTHER PUBLICATIONS

Gold filled association, "the Gold Filled Story", trade publication, 1982 edition, pp. 5 and 8 of 11 page document.*

* cited by examiner

Primary Examiner—David Jones
(74) Attorney, Agent, or Firm—Alfred M. Walker

(57) ABSTRACT

A silver filled gold jewelry wire item includes an inner precious metal core, such as silver, and an outer gold layer. The outer gold layer has a predetermined thickness of from about 0.0001 inch to about 0.002 inch, preferably no more than 0.001 inch thick, which is much thinner than durable hollow wires of at least 0.004 inch in thickness or greater. A forming process draws a gold sheet strip into an open channel shaped member into which a solid silver core is placed at ambient temperatures. The open channel shaped member is closed by further rollers at ambient temperatures and welding of a seam when closed about the solid core. The resultant solid tubular gold jewelry wire item resists damage from diamond cutting knives, and can be used to create jewelry rope chains, earrings and bangles.

32 Claims, 4 Drawing Sheets

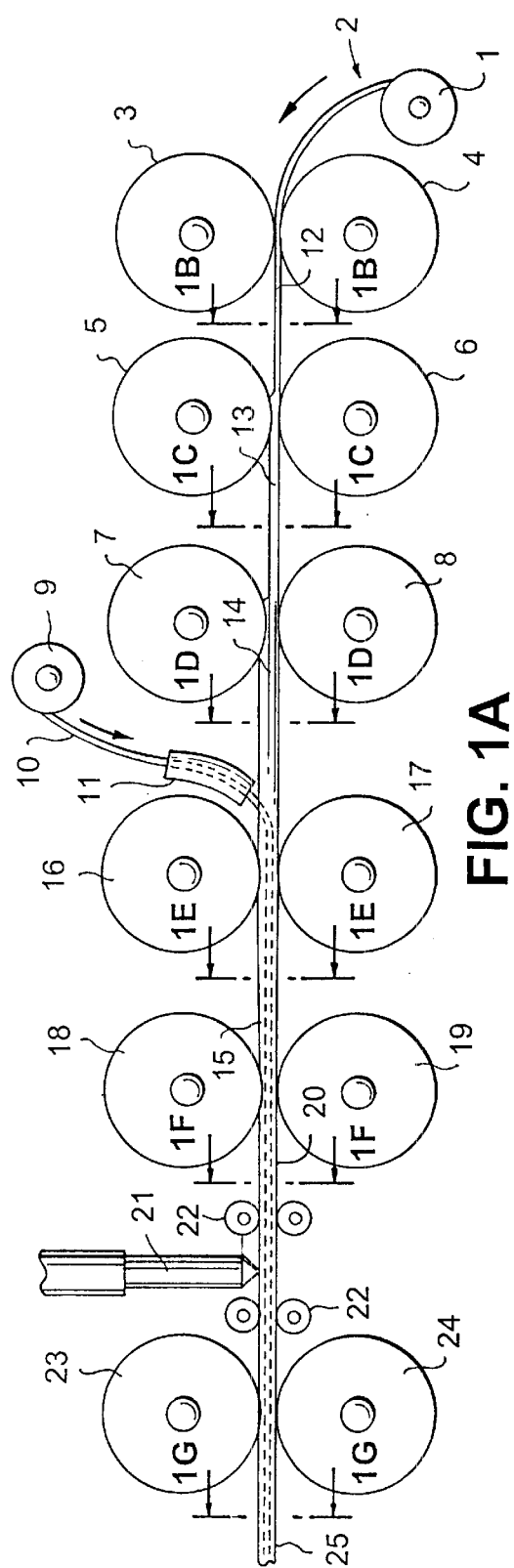

THIN WALLED ATTACHED SILVER FILLED GOLD JEWELRY

RELATED APPLICATIONS

This application is a continuation-in-part of application Ser. No. 09/100,726, filed Jun. 19, 1998, now U.S. Pat. No. 6,092,350.

FIELD OF THE INVENTION

The present invention relates to durable precious metal jewelry.

BACKGROUND

In recent years due to market acceptance of products having less gold content (ie. lighter weight than solid gold jewelry), the U.S. jewelry industry has gone through many changes. The latest trend is using the combination of silver and gold in making the jewelry objects, thus achieving a less expensive product by virtue of the fact that gold is priced about 70 times more than silver. Hollow wire or tubing with thin walls has been used for over 50 years. The widespread use of hollow rope chains and their popularity over the last 20 years has spawned several patents in this area.

The United States is the largest market for rope chains (800 million annually), and hollow rope chains in particular. Price wars have driven the producers to discover new ways of making a genuine gold product with thinner and thinner walls.

With the only criteria being to maximize economic price, poor quality and durability are the general result of making thin hollow gold rope chains. For example, hollow rope chains made of 0.009–0.014 inch diameter wire with a 0.002–0.003 inch wall thickness and having a weight of 1–2 grams/foot represent a significant portion of the U.S. rope chain market. The customer return rate of such hollow rope chains is tremendous. Some of those brittle hollow gold rope chains never reach the retail stores, since the chain is damaged in handling and shipping. Such hollow rope chains have a very short life; the smallest stretch or pressure on the 0.002–0.003 inch wall thickness can damage the fragile hollow rope chains.

Most of the hollow tubing or wire products use copper, steel, plastic or aluminum rod or wires as a temporary installation core at some stage in the manufacturing process. The purpose of such rods or wires is to temporarily support the thin walls of the outer gold tubing or to help coil or form the links of the gold product. These non-precious core materials are disposed of by an acid or caustic soda process at a later stage in manufacturing, resulting in toxic effluent.

Moreover, the hollow gold tubing from which hoop earrings and bangle bracelets are made presents great difficulties in coiling the tube. To prevent the thin hollow gold wall from collapsing, the tube is filled with fine sand prior to the coiling process. Still, damage is common during the coiling process. Due to such problems, a minimum practical wall thickness for this product remains 0.004–0.005 inch.

Background art includes multicolor chains of two different precious metals, such as yellow gold and white gold. The first multicolor chains, which were fashionable about fifteen years ago, were made by a specially developed machine which automatically fed different colored wires alternately to the assembly process. In another process, electroplating the chain with a different colored alloy and diamond cutting the chain to expose the inner alloy produced two-color chains.

U.S. Pat. No. 5,425,228 of Hillel describes a multi-color faceted rope chain and fabrication method. By using metal alloy tubes of different colors, thereby creating overlying layers of different colors in the cross section of the-wire, the various layers can be exposed by diamond cutting the chain to different depths. In diamond cutting, a jewelry chain is wrapped around a lathe and cut by a stationary knife held against the edges of the rotating chain. This is a much improved process compared to the plating process for producing multicolor chains. However, Hillel '228, in creating a multicolor chain, makes reference to rope chains made of links produced by wrapping a thin sheet of precious metal around a circular rod wire or core of the second metal of the second color using the same techniques as are now used in producing the hollow links for hollow link rope chain. This method therefore limits the outer layer of the gold sheet to 0.0025 inch or thicker, as noted in Hillel '228.

In the non-precious metal chain costume jewelry market, so called gold filled articles exist, such as noted in U.S. Pat. No. 778,238 of Tyler et al for a composite metal article having a superficial gold over layer. However, the interior of the costume jewelry article contains non-precious metals, such as copper alloys.

Furthermore, as noted on pages 5 and 8 of "The Gold Filled Story", a 1982 trade publication of the Gold Filled Association, the making of gold filled article is an expensive process involving both pressure and heat. To make a gold filled sheet, a layer of karat gold of proper thickness is fused to a suitable supporting copper alloy. Then under pressure and very exacting controls of heat and time, the two metals are fused together so that the bond between gold and supporting metal is flawless and permanent.

With a similar technology, gold filled wire is made by inserting a core of copper alloy into a gold cylinder and then they are fused together under controlled heat and pressure, so that a single round rod is made.

The rod is drawn repeatedly through powerful wire reducing mills and drawing die. This process requires special equipment for the bonding of the two metals together, and heavy rolling mills capable of handling the heavy rod.

In contrast to the gold filled prior art, as it will be disclosed in the Summary and Detailed Description of the present invention herein, by experimenting with silver, it has been found that no heat is required for completing a bonding between the gold and silver, therefore a more shorter technology can be developed for making a two metal wire or two metal stamped jewelry piece.

A relatively much thinner tubing than the rod in the gold filled application can be formed while a core of silver wire is being introduced. In this way the starting point of the wire making process is the use of a thicker wire, which can be drawn through drawing dies, and the rolling mill can be avoided as well the heating process.

As defined by the trade definition of a "gold filled" product in the aforementioned 1982 publication of The Gold Filled Association, in order to label a product "gold filled", in the bonding process heat and pressure has to be present, in order to form a permanent bonding between the two metals, namely, gold and the non precious alloy.

Mechanical attachment of a thin layer of gold, such as in a gold filled product, is allowed to be marked as "gold filled", if a layer of at least 10 Karat gold is permanently bonded by heat and pressure to one or more surfaces of supporting metal, thence rolled or drawn to a prescribed thickness.

The Karat gold layer must be at least 1/20th by weight of the total combined gold and base metal.

Other non-precious metal articles are made by electroplating, such as described in U.S. Pat. No. 4,377,448 of Kohl. The electroplating of gold jewelry is a process in which thin layers of gold can be deposited on the surface of a non precious metal by boiling with heat in a caustic chemical bath.

A product can be marked as "electroplated" when at least an equivalent of 7 millionth of an inch of fine gold is deposited on the metal.

In contrast to electroplating, such as in Kohl '448, the present invention proposes to achieve a thin wall product utilizing less expensive procedures than the gold filled process available for the small manufacturer and to create Karat and non Karat jewelry wire or rod products, made only with precious metals such as gold, silver and platinum.

It is safe to assume that in the gold filled process, if the copper alloy is substituted with silver, the process of bonding silver with gold permanently with controlled heat and pressure would be able to produce the wire or rod the present invention has in objective.

However, the present invention does not need such controlled heat and pressure, other than annealing during the process, nor does it need the heat and caustic chemical bath of electroplating.

Furthermore, it has not been proposed in the prior art to utilize a precious metal core with an outer layer of another precious metal, such as gold, in a jewelry rod or wire.

Therefore, the prior art discloses disadvantages and cumbersome heated and pressurized processes for creating thin walled gold filled and electroplated jewelry products. Furthermore, when hollow jewelry products are thus created, the walls are fragile and easily damaged in the finishing processes, such as diamond cutting, or during shipment.

OBJECTS OF THE INVENTION

An object of this invention is to create a jewelry product having a lower gold content than hollow gold tube products currently produced, with the strength of solid wire products.

A further object of this invention is to make a rod or wire of a precious metal, with an outer layer of Karat gold and a core of silver.

Another object of this invention is to produce a rod or wire having a gold outer layer under one thousandth of an inch thick with a silver reinforcing core.

Yet another object of this invention is to provide a practical cost-effective manufacturing process to produce a precious metal wire or rod product.

It is yet another object of this invention to provide a rod or wire having a gold outer layer with a process at ambient temperatures, without excessive heat, pressure or caustic chemical baths.

It is another object of this invention to provide a hollow tube with a silver inner layer and a thin outer layer of gold or platinum by an efficient process.

It is yet another object to provide a metal plate for jewelry stamping with a silver inner layer and a thin outer layer of gold or platinum.

It is still yet another object to improve over the disadvantages of the prior art.

SUMMARY OF THE INVENTION

In keeping with the foregoing objects and others which may become apparent, the present invention includes a tubular gold jewelry wire item having a longitudinally extending thin outer layer of gold and a longitudinally extending inner structural core of a suitably soft and yet rigid material, such as a precious metal, preferably silver.

In another embodiment, a metal plate with an inner silver layer and a thin outer layer of gold is stamped into non-tubular jewelry items such as earring pieces or bracelet charm pieces; which may be flat or three dimensional, depending upon how they are stamped.

The jewelry wire item includes a thin gold outer layer having a predetermined thickness which is from about 0.0001 inch, up to about 0.002 inch thick, preferably from about 0.0001 to about 0.001 inch thick. The silver core is securely bonded to the thin gold outer layer of the jewelry item.

A typical item of gold jewelry of the present invention is made by first rolling a sheet of gold into a thickness of from about 0.009 to about 0.10 inch thick. Then the gold sheet is trimmed and passed through a slitter to trim it into a gold strip, having a width equal to the circumference of a gold tube to be formed.

The trimmed gold strip is wound onto a spool and the trimmed gold strip is fed from the spool through a roll former having one or more pairs of rollers and guides which act in a plurality of roll forming steps. For example, the trimmed gold strip is flattened and then formed first into a channel-shape and then the channel-shaped gold strip is forced into a U-shape. The silver core material is introduced from a spool onto the center of the U-shaped gold strip. The-combined silver core material and U-shaped gold strip member is fed through a pair of pressure rollers for putting pressure on the sides of the U-shaped gold strip, thereby partly closing the gold strip circumferentially around the silver core material.

Then, the partly-closed gold tube containing silver core material is fed through a set of rollers for completing the circumferential closing of the gold strip into a tube surrounding the core material, and leaving a seam at the top of the gold tube.

The cored gold tube is then fed through a pair of guide rollers for precisely locating the seam for welding, and the seam-located cored gold tube is fed through a welder for welding the seam.

The seam-welded cored gold tube is then fed through exit rollers.

Thereafter, the seam-welded cored gold tube is further fed through a wire-drawing die at least twice to reduce its diameter and to pressure-lock the core with the gold-tube outer layer. This creates a solid wire of a thin gold outer tube in a secure adhesive contact with the core material.

The cored gold wire is then fed through diameter-reducing wire drawing dies, so that the gold outer-layer thickness is reduced proportionally to the diameter reduction of the cored gold wire from before to after being subjected to the diameter-reduction wire drawing dies.

The cored gold wire is continuously fed at ambient temperatures through the diameter-reducing wire drawing dies until a diameter reduction of the silver cored gold wire of from about 50% to about 60% has been achieved. Finally, the silver cored gold wire is preferably annealed at a temperature of about 1200 degrees Fahrenheit.

The welder may be a laser welding head, a tungsten inert gas (TIG) welder, or a plasma welder.

The resultant silver cored gold wire is durable and economic in price, and may be produced as a jewelry chain, a rope chain, a diamond cut chain, a diamond cut rope chain, an earring, a diamond cut earring, a bangle, a diamond cut bangle or other similar jewelry pieces. In an optional embodiment the pressure locked plates can be stamped into jewelry forms without being formed into jewelry wires.

In a further optional embodiment the silver cored gold wire is produced by producing a sandwich of gold and silver layers joined by soldering and then formed into a silver cored gold wire or a gold-silver plate which can be stamped.

BRIEF DESCRIPTION OF THE DRAWINGS

The present invention can best be understood in connection with the accompanying drawings, in which:

FIGS. 1A through 1G are schematic illustrations of the product forming process of the present invention wherein, FIG. 1A shows the roll forming line; and, FIGS. 1B through 1G show various product cross sectional views at various process points along the roll forming line of FIG. 1A;

DETAILED DESCRIPTION OF THE INVENTION

Figure 2A:
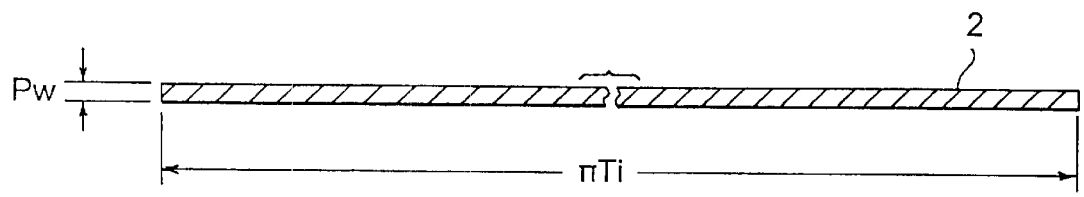
FIG. 2A is a cross sectional size comparison of a gold plate at the start of the product forming process as in FIGS. 1A through 1G.

Existing hollow gold chains have the goal of providing the same aesthetic appearance as their solid counterpart made from the same outside diameter wire. With a wall thickness of a minimum 0.002 to 0.003 inch, the existing chains have between 30 to 45% of the gold content of a similar solid chain.

In contrast, the goal of the present invention is to use a solid silver core with a much thinner outer gold layer, such as no greater than 0.002 inch, preferably about 0.001 inch or less in thickness, to provide a superior product in terms of strength and durability at a significantly lower cost due to reduced gold content. It has been found through experimentation that using a soft metal, such as silver, as a structural inner core, with a gold outer layer, and drawing the combined silver filled gold tube through dyes will result in a significant wall reduction of the outer layer in a predictable manner.

The result is a solid tubular gold jewelry wire which has an outer precious metal layer and an inner solid precious metal rod core, which is produced by the process of first feeding at ambient air temperature a solid precious metal rod core into an open, longitudinally extending precious metal outer tube. Then the open longitudinally extending precious metal tube is closed, and fed through a wire drawing die at ambient temperature reducing its thickness and pressure locking the precious metal core to the precious metal outer tube, thereby providing a solid wire comprised of the outer precious metal layer in a secure adhesive contact with the precious metal rod core.

For earrings or bangles, the thickness is 0.004 inch or less. As shown in drawing FIGS. 1A–1G, to form silver filled gold tube 1, first a karat gold outer layer, after casting, is rolled into a thin sheet 2 not less than 0.009–0.010 inch thickness. A slitter cuts gold sheet 2 to one having a width equal to the circumference of the outer gold tube to be formed.

For example, FIGS. 1A through 1G show a roll forming process to produce silver core gold item 1. A six or seven pass roll forming machine having pairs of rollers, and guides between them, gradually forms the gold sheet into a tube. Trimmed gold sheet 2 is fed from spoon 1 into the first pair of rollers 3, 4 which cuts the sheet 12 shown in cross section in FIG. 1B. Rollers 5, 6 form sheet 12 into gold member 13 having the profile shown thereat. Rollers 7, 8 further form gold sheet 13 into a "U"-shaped member 14 of FIG. 1D.

At this point, silver wire 10 from spool 9 is guided by guide member 11 into the center of U-shaped gold member 14, as the combination enters roller pair 16, 17. These latter rollers 16, 17 put pressure on the sides to draw wire 10 through while closing member 15 around silver core 10, as shown in FIG. 1E. Roller pair 18, 19 continues to close gold member 5 into closed tube 20 around silver core 10, with a seam 27 at the top as shown in FIG. 1F. Guide rollers 22 then precisely locate seam 27 for welding by welder 21. This may be a tungsten inert gas (TIG) welder, a plasma welder or a laser welding head.

Roller pair 23, 24 feeds the final gold wire member 25 out of this process step, as a gold tube with a loose silver core as shown in FIG. 1G.

Figure 2B:
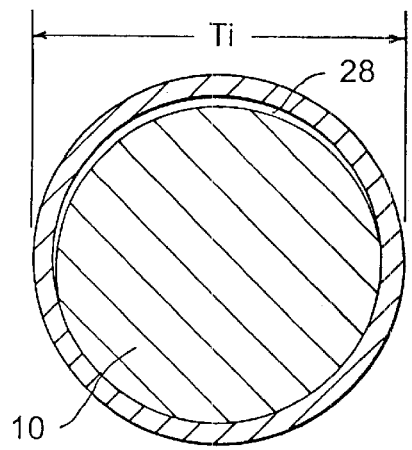
FIG. 2B is a cross sectional size comparison of a gold tube over a silver cored during the product forming process thereof.

FIG. 2B shows an enlarged cross section of gold member 25 from FIG. 1G A slight gap 28 exists between silver core 10 and gold outer layer 2a.

FIG. 2A shows an end cross section of gold sheet 2 before it is formed into a tube. As shown in FIG. 2A, gold sheet 2 has a thickness Pw and the width is equal to B times diameter Ti of round silver filled gold member 1, which is equal to the circumference of the gold tube with diameter Ti.

Figure 2C:
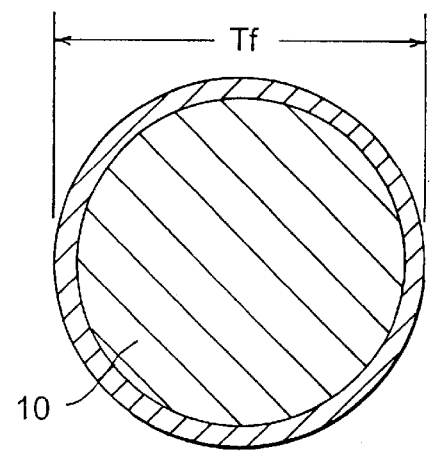
FIG. 2C is a cross sectional size comparison of the gold tube locked to the silver core during the product forcing process thereof.

After drawing the roll formed gold tube 1 with silver core 10 two times through a wire drawing die, the resulting gold silver core gold wire tube 1 will be 0.006 to 0.008 inch smaller in diameter, as shown in FIG. 2C, where Tf is slightly smaller than Ti. This drawing process locks silver core 10 to the outer gold layer 2a in such a close fit as characterized by intermolecular forces, so that it will now behave like a solid wire of a single material. The subsequent drawing of the gold silver wire progresses to a final size wire having a gold outer layer thickness reduced proportionally from the starting wall thickness Pw with the same proportion as the reduction of the diameter Tf to the final wire diameter Wf.

Figure 2D:
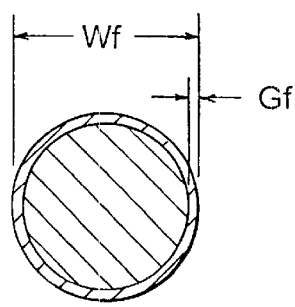
FIG. 2D is a cross sectional size comparison of the final wire product during the product forming process thereof.

FIG. 2D shows a final wire cross section with diameter Wf and gold thickness Gf.

In the illustrations of FIGS. 2A–2B, the overall ratio from Tf to Wf is about 10:1, to illustrate the cross sectional area reduction, while still permitting annotation. A more typical ratio is in the range of 20:1.

Several different wire sizes with a variety of gold thicknesses can be achieved. The following formulas will be used to calculate a given final wire size and gold thickness:

| | |
|---|---|
| Outside tube diameter as roll formed | Ti |
| Outside tube diameter after locking silver core to gold tube | Tf = Ti − .008 |
| Final wire diameter | Wf |
| Diameter reduction ratio | R = Tf/Wf |
| Initial plate thickness before rolling | Pw |
| Final gold thickness | Gf |
| Diameter reduction ratio | R = Pw/Gf |

As an example, suppose one prefers to have a 0.018 inches diameter silver core wire with a gold thickness of 0.0005 inches. If one starts with a gold sheet thickness of 0.010 inches, the initial starting tube diameter can be calculated as follows:

R=Pw/Gf=0.010/0.0005=20

R=Tf/Wf=Tf/0.018=20

Tf=0.018X20=0.360 inch (9.14 mm)

Ti=0.360+0.008=0.368 inch, the starting tube diameter.

After a 50–60% diameter reduction of the wire, an annealing at 1200 degrees F is required. In the manner described above, the present invention permits the fabrication of silver filled gold wire made of a gold outer layer of from 0.0005 inches up to about 0.002 inches thickness and having a silver core.

Figure 3:
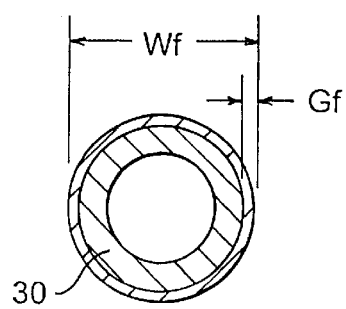
FIG. 3 is a cross sectional view of the gold tube product with a hollow silver core.

The process described above can also be used to produce bangles and earrings with a gold layer of 0.0005 inch up to 0.004 inches over a hollow silver core. The cross section of such a material is shown in FIG. 3 with inner silver tubular core 30. For practical reasons in the case of earrings and bangle products, to achieve the desired gold layer of gold tube 1a, silver core 30 has to be introduced in the welded gold tube only after the wall of the gold tube has been reduced to the limits allowed by present technologies (such as from 0.006 inches to about 0.007 inches). This is necessary due to the fact that to get the final tubing of 2–3 mm diameter with a wall of 0.0005 inches thickness, starting with a 0.009 inch wall, one should have an initial gold tube diameter of 36mm, which is totally impractical. A 12–15 mm diameter tubing with a 0.009 inch, gold thickness achieves a final gold layer of 0.0015 inches at from about 2–2.5 mm diameter tube with a silver core. To achieve a thinner layer of gold, the starting gold tube wall has to be less than 0.009 inches.

Figure 4:
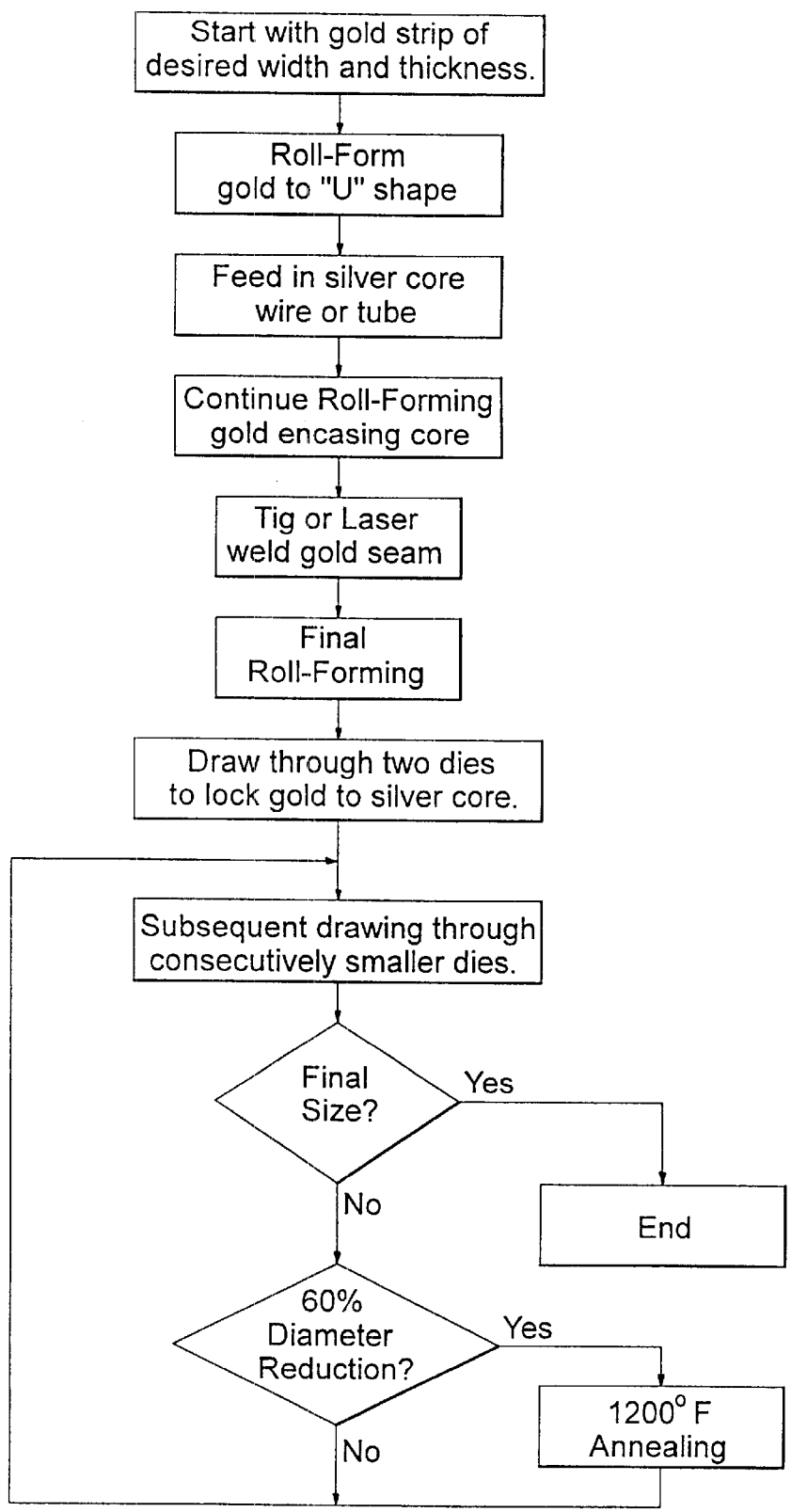
FIG. 4 is a process flow chart of one embodiment for the product forming process of the present invention; and, FIG. 5 is a process flow chart of an alternative product forming process of the present invention.

FIG. 4 is a process flow chart showing, in a concise fashion, the process steps described above.

An alternate process or method which is more efficient at producing larger diameter product such as for bangles and earrings is presented. Either a tubular hollow core (as shown in FIG. 3) or a solid core product can be produced in this manner. The outer precious metal can be platinum, instead of gold, with a gold or silver inner core.

Figure 5:
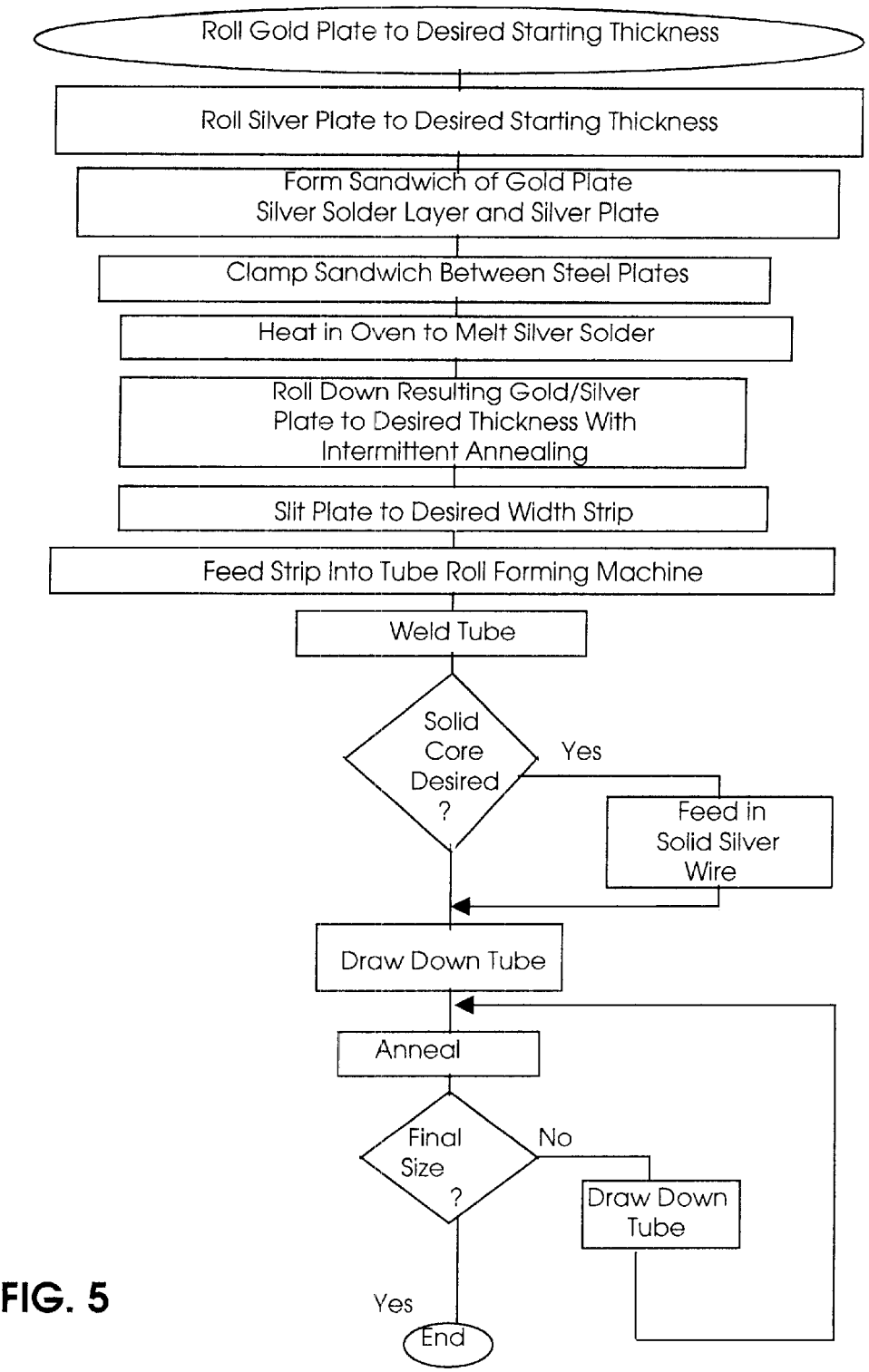

In this process, which is concisely presented in the flow chart of FIG. 5, the first step is to roll a gold plate to the desired starting thickness. Here, the process example is of a product with a silver core and a thin gold outer layer. A silver plate is rolled to its thicker starting thickness. A sandwich is formed of the gold plate, a thin layer of silver solder, and the silver plate; this is clamped between steel plates and heated in an oven to melt the silver solder. The resulting bonded gold/silver plate is rolled down to the desired final thickness with intermittent annealing.

After this, the plate is slit to the desired width and stamped into a desired jewelry form or is fed into a roll forming machine to form a tube. The seam of the tube is welded by an appropriate technique such as TIG or laser welding.

If a solid core is desired, solid silver wire is fed into the center either during the toll forming process step or after the tube is welded. The tube is then drawn down to the desired size with intermittent annealing steps.

A numerical example of the process will more clearly describe the steps involved. Suppose the objective is to produce a 6.2 mm (¼ inch) diameter tube with a 0.001 inch gold layer over a 0.009 inch silver layer. A 1 mm (0.039 inch) gold plate and a 10 mm (0.39 inch) silver plate with a 0.001 inch silver solder layer in between is clamped between two steel plates and placed in an oven. The oven can either be a controlled atmosphere electric oven or an open flame gas oven. The sandwich of gold-solder-silver is brought to the melting point of the silver solder which is approximately 640 Celsius (1210 degrees Fahrenheit).

The gold-silver plate is then rolled down to 0.25 mm (0.010 inch) with intermittent annealing at approximately 540 Celsius. At this step, the gold layer will be approximately 0.025 mm (0.001 inch) and the silver layer will be about 0.225 mm (0.009 inch). The gold-silver plate is then slit to a width of 19.5 mm (0.766 inch) and fed to a tube roll forming machine and welded. If at this time a smaller tube with a thinner outer gold layer is desired, the tube of 6.2 mm diameter can be drawn to a smaller size with a resulting decrease in wall thickness and, consequently, a thinner layer of gold.

Depending on the final diameter of the product, either the originally described process or this process will be advantageous. For sizes under 1 mm (0.039 inch) diameter, the first gold-silver core process is more advantageous. For sizes over 1 mm (0.039 inch) diameter, the second method, gold-silver solder-silver plate, and silver core will be preferred. The savings in labor cost due to the number of drawings and annealing steps required are the governing factors in deciding which method should be used.

Earring and bangles made of tubing due to functional characteristics have to stay hollow. Therefore the following alternative manufacturing methods are used to produce hollow thin walled silver filled gold jewelry.

For example, as also noted in FIG. 3, a gold-silver plate, where the gold is soldered to the silver, is rolled to a thickness where the gold layer becomes less then 0.002 inch and where the silver layer is about 0.007–0.009 inch. It is roll formed and welded into a tube.

The tube then is drawn to the required size to produce earring or bangles, etc.

The following is a numerical example to produce a 6.2 mm (¼ inch) diameter tube having a 0.001 inch gold layer and a 0.009 inch silver layer.

A gold plate of 1 mm (0.039 inch) and a silver plate of 10 mm (3.9 inch) with a 0.001 inch silver solder in between the gold and silver plate is clamped together in a sandwich between two steel plates and is placed in a oven. The oven can be a controlled atmosphere electric oven, or open flame gas oven. Then, the sandwich of silver-solder-gold is brought to the melting point of the silver solder, approximately 640 degree Celsius (1210 degree Fahrenheit).

The gold-silver plate is then rolled down to a thickness of 0.25 mm (0.010 inch) with intermittent annealing at approximately 540 degree Celsius.

At this time the gold layer is approximately 0.025 mm (0.001 inch) and the silver layer is 0.225 mm (0.009 inch). The gold-silver plate is processed trough a slitter machine to get the right width of the plate of 19.5 mm (7.66 inch). The plate is then fed in the tube roll forming machine and welded.

If at this time a thinner gold layer is required, the tube of 6.2 mm is drawn to a different outside diameter while the wall thickness is also reduced to a smaller size and subsequently a thinner layer of gold is produced.

The above numerical example can be modified to any parameters required by the final product.

The technology of a solid thin wall silver filled gold wire; depending on the final parameters, can be processed in the same way as described above, by making first a gold-silver and solder-silver sandwich, which is than formed into a tube, and during forming a solid silver wire is introduced as a core.

The combination of a silver-gold tube with the additional silver core is than drawn to the final required size. Dependent on the final size wire, one or the other method is utilized. For sizes under 1 mm (0.040 inch) of wire diameter the first method of a gold-silver core is more advantageous. For sizes bigger than 1 mm (0.040 inch) of wire diameter the second method of a gold-silver with solder-silver plate and silver core is preferred.

As noted before, in the process of FIG. 5, after the gold-silver plate is slit, it can be optionally stamped into a desired jewelry form, or its can become a wire by the aforementioned described method.

The savings in labor cost due to the number of drawings and annealing required are the governing factors in deciding which method to be used.

The gold-silver with solder-silver plate can be used with any advantages over the previously described applications to substitute in the prior art of hollow rope chain manufacturing and to get a similar heavy wall product as the only gold hollow rope chain.

It is further known that other modifications may be made to the present invention, without departing from the scope of the invention, as noted in the appended claims.

What is claimed is:

1. A solid tubular gold jewelry wire item comprising a longitudinally extending outer layer of gold and a longitudinally extending inner core of a precious metal, wherein said jewelry wire item has a wall thickness of from a minimum wall thickness of about 0.0001 inch to a maximum wall thickness of about 0.002 inch in thickness.

2. The solid tubular gold jewelry wire item of claim 1 wherein further said predetermined thickness of said gold outer layer is from about 0.0001 inch to about 0.001 inch thick.

3. The solid tubular gold jewelry wire item of claim 1 wherein further said inner core comprises a precious metal alloy.

4. The solid tubular gold jewelry wire item of claim 1 wherein further said inner core comprises silver.

5. The solid tubular gold jewelry wire item of claim 4 wherein said item is a chain.

6. The solid tubular gold jewelry wire item of claim 4 wherein said item is a rope chain.

7. The solid tubular gold jewelry wire item of claim 4 wherein said item is a diamond cut chain.

8. The solid tubular gold jewelry wire item of claim 4 wherein said item is a diamond cut rope chain.

9. The solid tubular gold jewelry wire item of claim 1 wherein further said core is securely bonded to said gold outer layer.

10. The solid tubular gold jewelry wire item of claim 1 wherein said item is an earring.

11. The solid tubular gold jewelry wire item of claim 1 wherein said item is a diamond cut earring.

12. The solid tubular gold jewelry wire item of claim 1 where in said item is a bangle.

13. The solid tubular gold jewelry wire item of claim 1 wherein said item is a diamond cut bangle.

14. A solid tubular gold jewelry wire item having an outer precious metal layer with a minimum wall thickness of from 0.0001 inch to a maximum wall thickness of about 0.002 inch thickness, and an inner solid precious metal rod core, produced by the process of:

a) feeding at ambient temperature a solid precious metal rod core into an open longitudinally extending precious metal outer tube;

b) closing said open longitudinally extending precious metal tube;

c) feeding said open longitudinally extending precious metal tube having said solid precious metal rod core through a wire drawing die at ambient temperature;

d) reducing its thickness and pressure;

e) taking said precious metal core to said precious metal tube; and, thereby creating a solid wire comprised of said outer precious metal layer in a secure adhesive contact with said precious metal rod core.

15. A solid tubular gold jewelry wire item comprising a solid longitudinally extended outer layer of a precious metal and a solid longitudinally extended inner core of a soft precious metal soldered to the outer layer, wherein said jewelry wire item has a wall thickness of a minimum wall thickness of from about 0.0001 inch to a maximum wall thickness of no greater than 0.002 inch in thickness.

16. The solid tubular jewelry item of claim 15 where the said soft precious metal inner core is a tube.

17. The solid tubular jewelry item of claim 15 wherein said item is a chain.

18. The solid tubular gold jewelry wire item of claim 15 wherein said item is a rope chain.

19. The solid tubular gold jewelry wire item of claim 15 wherein said item is a diamond cut chain.

20. The solid tubular gold jewelry wire item of claim 15 wherein said item is a diamond cut rope chain.

21. The solid tubular gold jewelry wire item of claim 15 wherein said item is an earring.

22. The solid tubular gold jewelry wire item of claim 15 wherein said item is a diamond cut earring.

23. The solid tubular gold jewelry wire item of claim 15 wherein said item is a bangle.

24. The solid tubular gold jewelry wire item of claim 15 wherein said item is a diamond cut bangle.

25. The solid jewelry item of claim 15 wherein said outer layer is gold.

26. The solid jewelry item of claim 15 wherein said outer layer is platinum.

27. The solid jewelry item of claim 15 wherein said inner layer is gold.

28. The solid jewelry item of claim 15 wherein said inner layer is silver.

29. A solid gold jewelry item comprising an outer layer of gold and a solid inner layer of a soft precious metal joined to said outer layer, wherein said gold jewelry item includes said outer layer of gold with a wall thickness of from a minimum wall thickness of about 0.0001 inch to no greater than a maximum wall thickness of about 0.002 inch.

30. The solid gold jewelry item of claim 29 wherein said item is a flat plate stamped to a predetermined shape.

31. The solid gold jewelry item of claim 30 wherein said item is an earring piece.

32. The solid gold jewelry item of claim 30 wherein said item is a bracelet charm.

\* \* \* \* \*

(12) INTER PARTES REEXAMINATION CERTIFICATE (0018th)
United States Patent
Grosz

(10) Number: US 6,381,942 C1
(45) Certificate Issued: *Apr. 15, 2008

(54) THIN WALLED ATTACHED SILVER FILLED GOLD JEWELRY

(76) Inventor: Robert Grosz, 22906 Banyan Place 190, Saugus, CA (US) 91350

Reexamination Request:
No. 95/000,055, Oct. 14, 2004

Reexamination Certificate for:
Patent No.: 6,381,942
Issued: May 7, 2002
Appl. No.: 09/521,015
Filed: Mar. 7, 2000

(*) Notice: This patent is subject to a terminal disclaimer.

Related U.S. Application Data

(63) Continuation-in-part of application No. 09/100,726, filed on Jun. 19, 1998, now Pat. No. 6,092,358.

(51) Int. Cl.
 *B21L 3/00* (2006.01)
 *B21C 37/04* (2006.01)
 *A44C 27/00* (2006.01)

(52) U.S. Cl. .................. 59/35.1; 59/16; 29/896.41
(58) Field of Classification Search ............... None
See application file for complete search history.

(56) References Cited

U.S. PATENT DOCUMENTS

| 440,693 | A | 11/1890 | Burdon |
|---|---|---|---|
| 446,618 | A | 2/1891 | Burdon |
| 550,705 | A | 12/1895 | Williams |
| 831,887 | A | 9/1906 | Nicholson |
| 921,722 | A | 5/1909 | Meyer |
| 944,640 | A | 12/1909 | Ungerer et al. |
| 978,846 | A | 12/1910 | Carlisle |
| 978,847 | A | 12/1910 | Carlisle |
| 1,109,423 | A | 9/1914 | Kammerer |
| 1,196,010 | A | 8/1916 | Merritt |
| 1,227,346 | A | 5/1917 | Trood et al. |
| 1,610,225 | A | 12/1926 | Metcalf |
| 2,155,584 | A | 4/1939 | Bryant et al. |
| 2,246,221 | A | 6/1941 | Prestinari et al. |

(Continued)

FOREIGN PATENT DOCUMENTS

| CH | 607 678 | 10/1978 |
|---|---|---|
| EP | 0 221 492 | 5/1987 |
| EP | 0 638 256 A1 | 2/1995 |
| GB | 2 042 943 | 10/1980 |
| IT | 1154682 | 10/1980 |
| IT | 01243137 | 8/1990 |
| NL | 1000789 | 1/1997 |
| WO | WO 94/22341 | 10/1994 |

OTHER PUBLICATIONS

"The Gold Filled Story"; Published by the Gold Filled Association, 1982 edition.
Product Catalogue for Tube Making Machine MOD. 308/T; 2000.
Product Catalogue Tools for Tube Forming Machine Mod. MINI; 1990.
Product Catalogue Tools for Making Machines for Gold Industry Nuts and Bolts Supply.

*Primary Examiner*—Jeanne M Clark

(57) ABSTRACT

A silver filled gold jewelry wire item includes an inner precious metal core, such as silver, and an outer gold layer. The outer gold layer has a predetermined thickness of from about 0.0001 inch to about 0.002 inch, preferably no more than 0.001 inch thick, which is much thinner than durable hollow wires of at least 0.004 inch in thickness or greater. A forming process draws a gold sheet strip into an open channel shaped member into which a solid silver core is placed at ambient temperatures. The open channel shaped member is closed by further rollers at ambient temperatures and welding of a seam when closed about the solid core. The resultant solid tubular gold jewelry wire item resists damage from diamond cutting knives, and can be used to create jewelry rope chains, earrings and bangles.

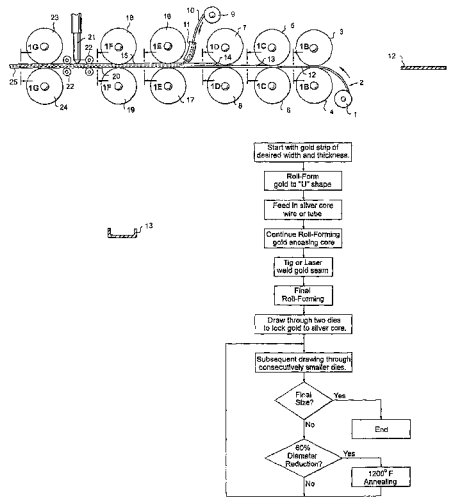

U.S. PATENT DOCUMENTS

| | | | |
|---|---|---|---|
| 2,364,674 A | * 12/1944 | Swift | 428/607 |
| 2,425,299 A | 8/1947 | Ballou, Jr. | |
| 3,607,150 A | 9/1971 | McGinn et al. | |
| 3,778,238 A | 12/1973 | Tyler et al. | |
| 4,114,398 A | 9/1978 | Orlandini | |
| 4,377,448 A | 3/1983 | Kohl | |
| 4,745,035 A | 5/1988 | Saurer et al. | |
| 4,917,967 A | 4/1990 | Cupolo et al. | |
| 4,986,067 A | 1/1991 | Caccialupi | |
| 4,996,835 A | 3/1991 | Rozenwasser | |
| 5,129,220 A | 7/1992 | Strobel | |
| 5,303,540 A | 4/1994 | Rozenwasser | |
| 5,425,228 A | 6/1995 | Hillel | |
| 5,626,012 A | 5/1997 | Fabbro | |
| 5,653,100 A | 8/1997 | Dal Monte | |
| 6,092,556 A | 7/2000 | Adkins | |

* cited by examiner

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1–32 are cancelled.

\* \* \* \* \*